US010551655B2

(12) United States Patent
Chinen et al.

(10) Patent No.: US 10,551,655 B2
(45) Date of Patent: Feb. 4, 2020

(54) DISPLAY DEVICE AND METHOD FOR MANUFACTURING DISPLAY DEVICE

(71) Applicant: Japan Display Inc., Minato-ku (JP)

(72) Inventors: Satoshi Chinen, Tokyo (JP); Kenji Tanase, Tokyo (JP); Fumihito Shibano, Tokyo (JP); Yuzo Kanari, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/211,558

(22) Filed: Dec. 6, 2018

(65) Prior Publication Data

US 2019/0113798 A1 Apr. 18, 2019

Related U.S. Application Data

(63) Continuation of application No. 15/942,650, filed on Apr. 2, 2018, now Pat. No. 10,197,835, which is a continuation of application No. 15/478,544, filed on Apr. 4, 2017, now Pat. No. 10,036,910.

(30) Foreign Application Priority Data

Apr. 7, 2016 (JP) .................................. 2016-077492

(51) Int. Cl.
*G02F 1/1333* (2006.01)
*G02F 1/1335* (2006.01)
*G02F 1/1339* (2006.01)

(52) U.S. Cl.
CPC ...... *G02F 1/133345* (2013.01); *G02F 1/1339* (2013.01); *G02F 1/133512* (2013.01); *G02F 1/133528* (2013.01); *G02F 2201/56* (2013.01)

(58) Field of Classification Search
None
See application file for complete search history.

(56) References Cited

U.S. PATENT DOCUMENTS

| 6,791,905 B1 * | 9/2004 | Sekiguchi | G04B 19/12 368/205 |
| 2003/0090615 A1 * | 5/2003 | Park | G02F 1/1339 349/153 |
| 2016/0041413 A1 * | 2/2016 | Nishino | G02F 1/1339 349/42 |

FOREIGN PATENT DOCUMENTS

| JP | 11-305246 | 11/1999 |
| JP | 2010-139657 | 6/2010 |

* cited by examiner

*Primary Examiner* — Phu Vu
(74) *Attorney, Agent, or Firm* — Oblon, McClelland, Maier & Neustadt, L.L.P.

(57) ABSTRACT

According to one embodiment, a display device includes a first substrate including a first area, a second area, a third area and a fourth area from an end portion to an inner side in a planar view. An organic insulating film is present in the second area and the third area, and is not present in the fourth area. A conductive film is formed at least on the organic insulating film of the second area. A sealing material is present in the first area, the third area and the fourth area to attach the first substrate and a second substrate. A through portion is adjacent to an inner side of the fourth area and penetrates the first substrate, the second substrate and the sealing material.

10 Claims, 13 Drawing Sheets

DISPLAY DEVICE AND METHOD FOR MANUFACTURING DISPLAY DEVICE

CROSS-REFERENCE TO RELATED APPLICATIONS

This application is a continuation of U.S. application Ser. No. 15/942,650, filed Apr. 2, 2018, which is a continuation of U.S. application Ser. No. 15/478,544, filed Apr. 4, 2017 (now U.S. Pat. No. 10,036,910), which is based upon and claims the benefit of priority from Japanese Patent Application No. 2016-077492, filed Apr. 7, 2016, the entire contents of which are incorporated herein by reference.

FIELD

Embodiments described herein relate generally to a display device and a method for manufacturing a display device.

BACKGROUND

Recently, liquid crystal display panels have been used for wearable devices, which are assumed to be worn by the user. Liquid crystal display panels can display pictures, letters, drawings, figures, etc. Since the display content can be switched, liquid crystal display panels are expected to be used in various ways as wearable devices. Normally, a liquid crystal display panel comprises a first substrate on which a plurality of pixel electrodes are arranged, a second substrate facing the first substrate, and a liquid crystal layer interposed between the first substrate and the second substrate. The liquid crystal display panel further comprises an outer circumferential sealing material. The sealing material integrates the substrates along the outer circumferential portions of the substrates and seals the liquid crystal.

The above wearable devices include a wrist watch type integrated with a clock mechanism having hands. This device requires a small through portion which penetrates the liquid crystal display panel to allocate the axes of rotation of the hands. To seal the liquid crystal between the substrates, an inner sealing material having a ring shape should be provided around the through portion.

A process for manufacturing the above wearable device includes a step for applying the outer sealing material and the inner sealing material to the first substrate, attaching the second substrate to the first substrate, and injecting a liquid crystal.

Thus, the manufacturing process requires a step for applying the inner sealing material around the small through portion so as to have a ring shape. In this step, an appropriate amount of sealing material needs to be applied to each part of the ring in a process of forming a circular pattern. When the second substrate is attached to the first substrate, the substrates are pressed. At this time, the line width of the inner sealing material should not exceed a predetermined width. However, when the sealing material is applied in a ring shape, the sealing material may be redundant at the overlapping connected portion for connecting surely the start portion of the material with the end portion of the material. In the conventional device, in many cases, the width of the inner sealing material extends outward beyond the scope of the assumption when the second substrate is attached to the first substrate. As a result, the width of a light-shielding film also has to be increased to shield the sealing material from light, in other words, such that the sealing material is not seen from the outside. When the line width of the sealing material is increased, a part of the sealing material is extended to a display area and disturbs display.

DETAILED DESCRIPTION

Various embodiments will be described hereinafter with reference to the accompanying drawings.

Embodiments provide a display device and a method for manufacturing a display device, preventing a sealing material from unnecessarily expanding outward between a first substrate and a second substrate, reducing the width of a light-shielding film, and enhancing the reliability of a display area with respect to display.

In general, according to one embodiment, a display device comprises:

a first substrate comprising a first area, a second area, a third area and a fourth area from an end portion to an inner side in a planar view;

an organic insulating film which is present in the second area and the third area, and is not present in the fourth area;

a conductive film provided on the organic insulating film of the second area;

a second substrate facing the first substrate;

a sealing material which is present in the first area, the third area and the fourth area, and is used to attach the first substrate and the second substrate; and a through portion which is adjacent to an inner side of the fourth area and penetrates the first substrate, the second substrate and the sealing material.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration in no way restricts the interpretation of the invention. In addition, in the specification and drawings, structural elements which function in the same or a similar manner to those described in connection with preceding drawings are denoted by like reference numbers, detailed description thereof being omitted unless necessary.

This specification uses the terms "upper", "lower", "outer" and "inner" to explain the relative positional relationships between a particular structure and other structures in drawings. In a lateral view, this specification defines the color filter side relative the electrooptic layer side as the upper side, and defines the opposite side as the lower side. In a planar view, this specification defines the edge side of each substrate relative the center of the display area as the outer side, and defines the opposite side as the inner side.

In this specification, the term "image display device" refers to a device which displays an image with an electrooptic layer. Thus, the image display device may be a display module (or a display panel) including an electrooptic layer, or may be a display device manufactured by combining a display module and other elements (for example, a backlight, cover glass and a polarizer).

In each embodiment, the electrooptic layer could be a liquid crystal layer, an electroluminescence (EL) layer, an electrochromic (EC) layer or an electrophoresis layer on the condition that it does not raise a technical contradiction. In this specification, each embodiment discloses a display device using a liquid crystal module including a liquid crystal layer as an example of an image display device. However, the present invention may be also applied to a display device using a display module including another electrooptic layer as described above.

At first one of embodiments is described.

Figure 1A:
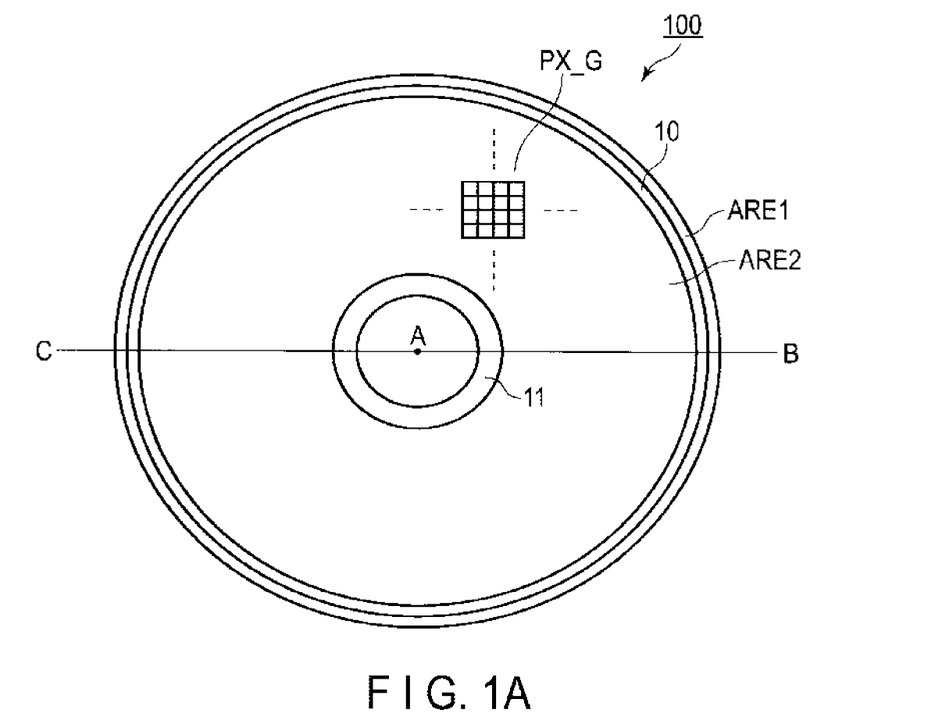
FIG. 1A is a planar view schematically showing a first substrate of a display device according to one embodiment.
Figure 1B:
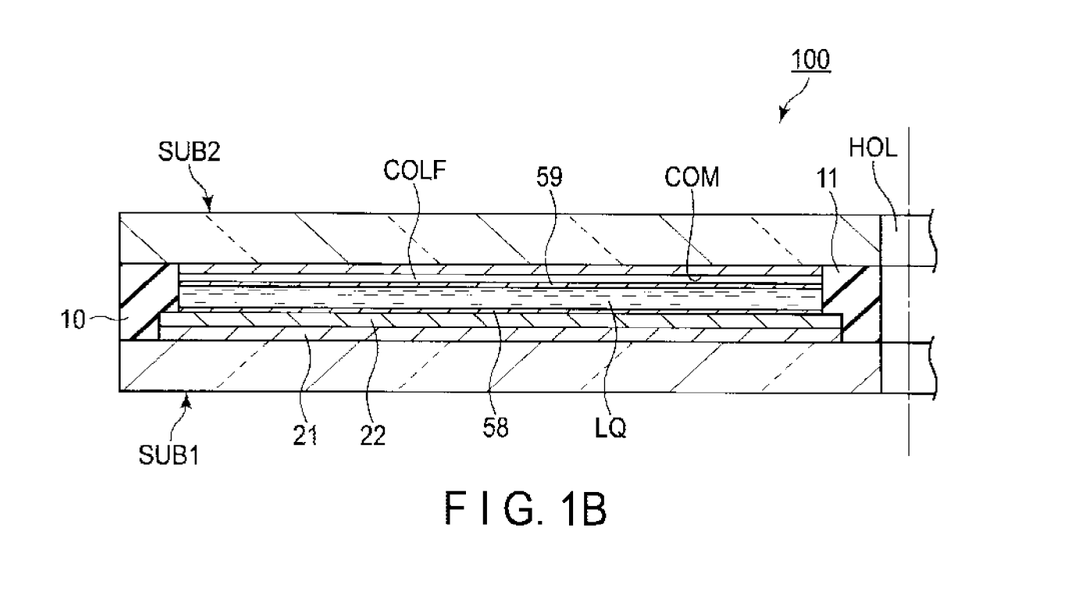
FIG. 1B schematically shows partially the structure of the cross-sectional surface of the display device according to the embodiment.

FIG. 1A is a planar view schematically showing the structure of a first substrate SUB1 of a display device 100. FIG. 1B schematically shows the cross-sectional surface of the display device 100. The first substrate SUB1 (which may be called an array substrate) comprises, for example, a glass plate (or a transparent resin plate) as the base plate. A group of subpixels PX_G including a plurality of subpixels is formed in a display area ARE1 on a side of the glass plate. As shown in FIG. 1B, the first substrate SUB1 is integrated with a second substrate SUB2 by sealing materials 10 and 11. A liquid crystal is interposed between the first substrate SUB1 and the second substrate SUB2 to form a liquid crystal layer LQ. FIG. 1B schematically shows, on the liquid crystal layer LQ side of the first substrate SUB1, a semiconductor layer 21 structuring a group of subpixels, a pixel electrode layer 22 forming a pixel electrode, and the layer of an alignment film 58 facing the liquid crystal layer LQ and defining the direction of alignment of the liquid crystal. FIG. 1B also schematically shows a color filter layer COLF, a common electrode COM, and the layer of an alignment film 59 facing the liquid crystal layer and defining the direction of alignment of the liquid crystal. The common electrode COM, the color filter layer COLF and the layer of alignment film 59 are formed on the second substrate SUB2 in this order from the glass plate side toward the liquid crystal layer LQ.

In FIG. 1A, the display device 100 is circular as seen in plan view (in other words, when viewed perpendicularly to the substrate surface). However, the display device 100 may be shaped in various ways. For example, the display device 100 may be rectangular, triangular or polygonal. The present embodiment is a display device integrated with a device having the axis of rotation, for example, a watch. Since the present embodiment is applied to a wearable device which is circular, the first substrate SUB1 and the second substrate SUB2 are circular as seen in plan view. In the example of FIG. 1A and FIG. 1B, sealing materials 10 and 11 have a circular ring shape as seen in plan view.

In FIG. 1A and FIG. 1B explained above and FIG. 2 and FIG. 3 explained below, a through portion HOL is formed in a fifth area ARE5 as the central area of each substrate. As described later, the through portion HOL is formed after the first substrate SUB1 and the second substrate SUB2 are attached to each other.

Figure 2:
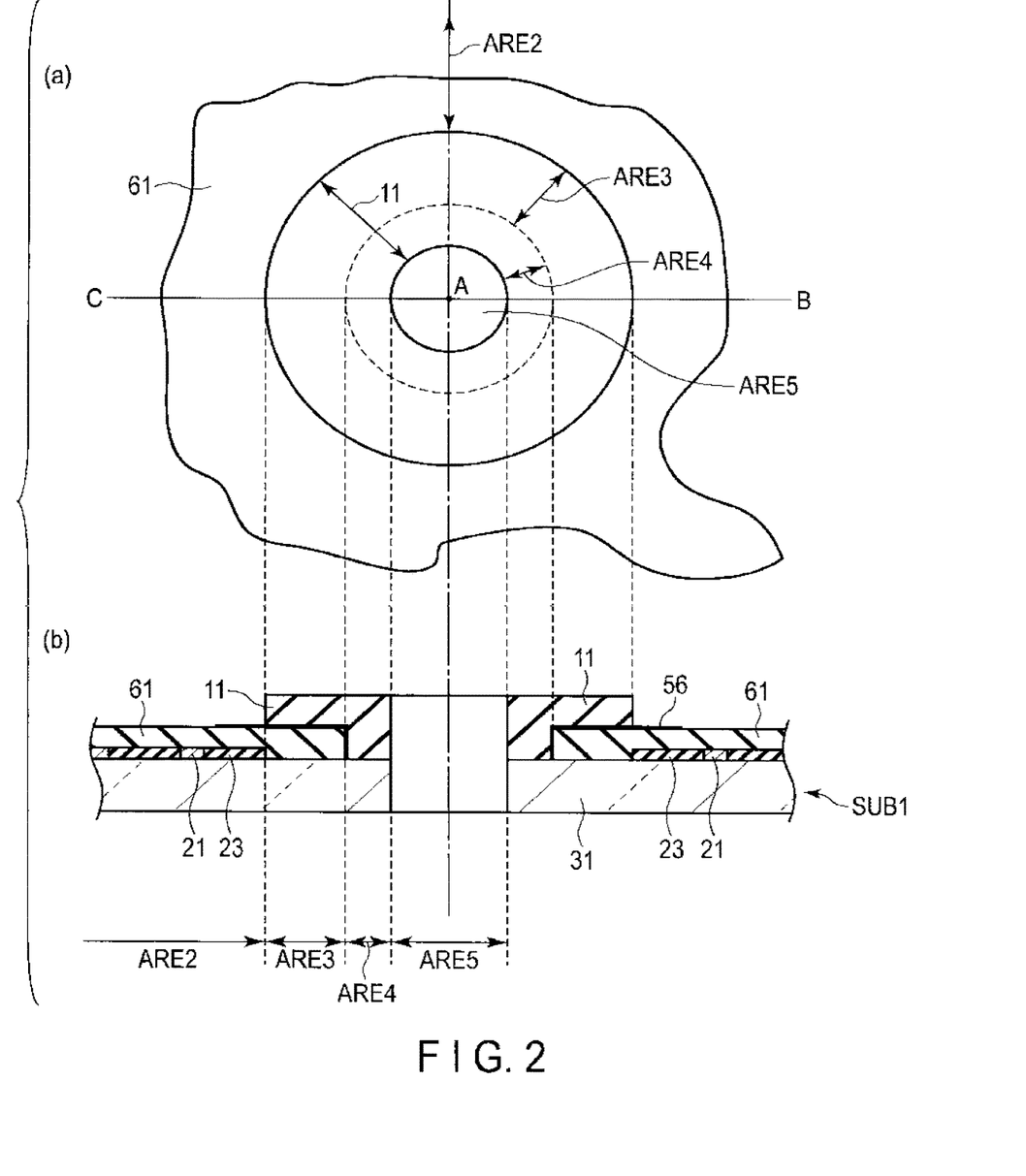
FIG. 2 includes a planar view showing the vicinity of the central portion of the first substrate of the display device according to the embodiment, and a cross-sectional view taken along line C-A-B shown in the vicinity of the central portion.
Figure 3:
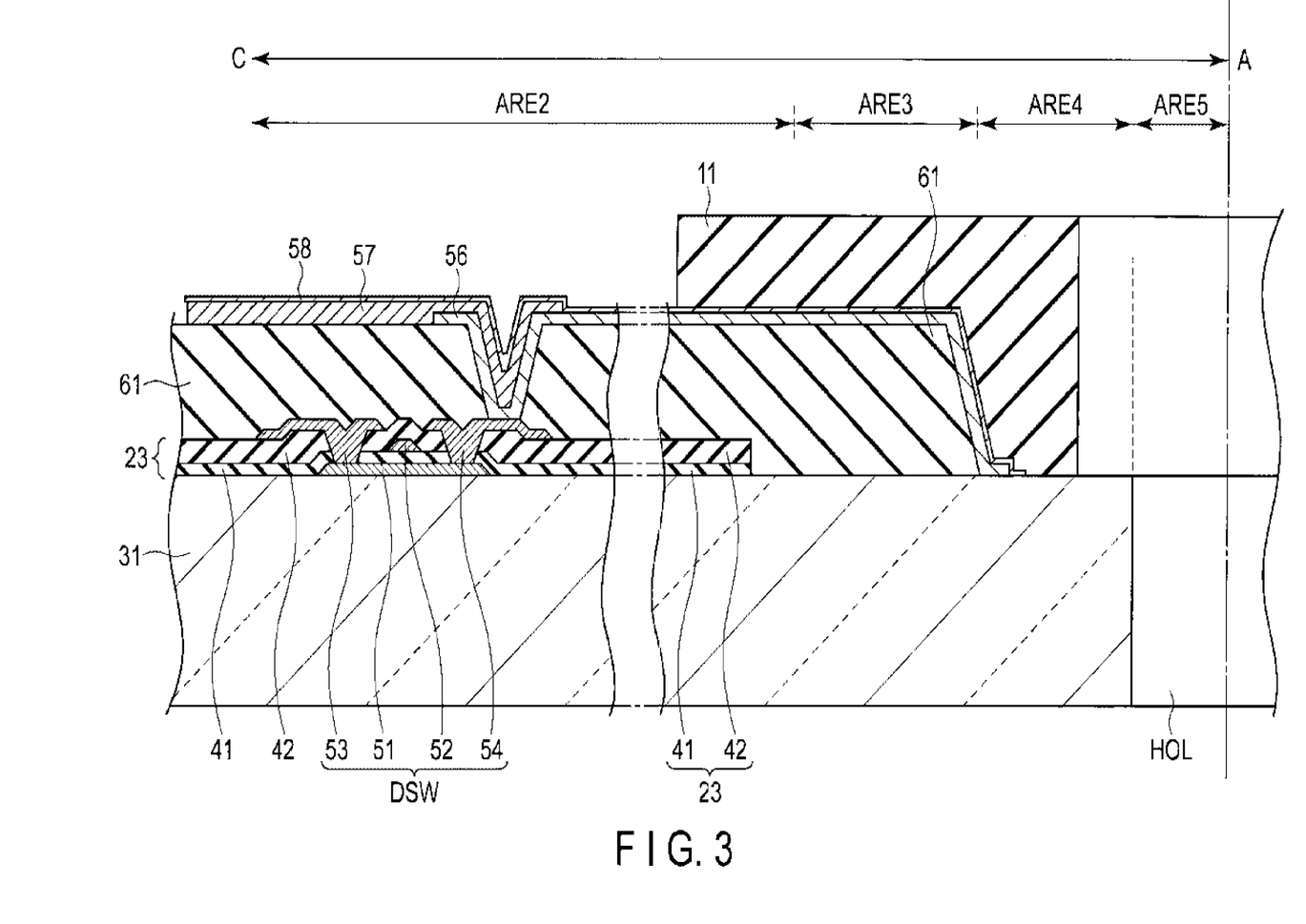
FIG. 3 is a cross-sectional view taken along line A-C shown in FIG. 2.

The display device 100 is explained with enlarged views of the vicinity of the through portion HOL. See FIG. 2 and FIG. 3. As shown in FIG. 2 and FIG. 3, in a planar view, the liquid crystal layer LQ side of the first substrate SUB1 comprises the first area ARE1, which is the border area shown in FIG. 1A, a second area ARE2, a third area ARE3, a fourth area ARE4 and the fifth area ARE5 from the end portion (the outer circumferential edge) to the inner side (the inner circumferential side). The through portion HOL (see FIG. 2) is provided in the fifth area ARE5 such that the bearing of shafts of each hand pass through the through portion HOL.

The second area ARE2 is provided from the outer circumferential side to the inner circumferential side. A display area is set in the second area ARE2. As shown in FIG. 3, a drive switching element DSW for applying drive potential to a pixel electrode 57 is formed on a glass plate 31 in the display area by using a semiconductor channel 51. In the present embodiment, a reflective display system (in other words, a system for reflecting outside light on the pixel electrode and outputting the light to the second substrate SUB2 side) is assumed. Thus, the pixel electrode is formed of, for example, silver. The drive switching element DSW comprises the semiconductor channel 51, a gate electrode 52, a source electrode 53 and a drain electrode 54. The semiconductor channel 51 comprises a channel area at the central position facing the gate electrode 52. The source electrode 53 is connected to a source area on one side of the channel area. The drain electrode 54 is connected to a drain area on the other side of the channel area. An insulating layer 41 provided between the gate electrode 52 and the semiconductor channel 51 is a first insulating layer which covers the layer of the semiconductor channel 51. An insulating layer 42 is a second insulating layer which covers the layer of the gate electrode 52. The first insulating layer 41 and the second insulating layer 42 extend to the vicinity of the inner circumferential end portion of the second area ARE2 as an insulating layer 23 shown in FIG. 2.

FIG. 3 shows only one drive switching element DSW as a representative of the drive switching elements DSW. However, in the actual device, a plurality of drive switching elements DSW corresponding to a plurality of subpixels are arrayed in a two-dimensional manner inside the first substrate SUB1. In the present embodiment, a display system in which a memory element is incorporated into a pixel circuit (in other words, a memory-in-pixel (MIP) display system) is employed. Thus, a memory element for retaining data 1 or 0 is provided so as to correspond to each subpixel. Although not shown in the drawings, for example, a switching element for structuring the memory element and a write switching element for writing data from a data line to the memory are provided.

The source electrode 53 and the drain electrode 54 are formed of, for example, metal such as aluminum. The gate electrode 52 is connected to a scanning signal line (not shown) formed on the first insulating layer 41. The source electrode 53 is connected to a video signal line (not shown) formed on the second insulating layer 42.

An organic insulating film 61 is formed on the semiconductor layer 21. The organic insulating film 61 is formed at least in the second area ARE2. The organic insulating film 61 serves to planarize the asperities or unevenness of the semiconductor layer 21. Thus, the organic insulating film 61 may be called a planarization film 61. The inner circumferential side of the planarization film 61 covers the inner circumferential edge of the insulating layer 23 (see FIG. 2(b) and FIG. 3).

On the planarization film 61, the pixel electrode 57 is provided so as to correspond to the drive switching element DSW. The pixel electrode 57 and the drain electrode 54 of the drive switching element DSW are connected to each other by metal formed in a contact hole, for example, indium tin oxide (ITO; connective metal) 56 having transparency. The contact hole is formed in the planarization film 61.

In many cases, the subpixels on the innermost circumferential side of the second area ARE2 are structured as dummy subpixels. Dummy pixels are pixels which overlap a light-shielding film and do not contribute to display. When the subpixels are dummy subpixels, the drive switching elements DSW are maintained so as to be always in an off-state. Thus, the actual driving is not performed. The ITO (connective metal) 56 structuring a part of each dummy subpixel is formed so as to extend in the third area ARE3 or a part of the fourth area ARE4 after the planarization film 61 is formed. Thus, the ITO 56 covers the planarization film 61 (see FIG. 3).

Further, alignment film 58 is formed over the entire surfaces of the ITO 56 and the pixel electrode 57. Alignment film 58 may be formed in the range of the second area ARE2.

In the above display device, alignment film 58 is provided inside the inner circumferential (central) sealing material 11. The ITO 56 is provided under alignment film 58. In the manufacturing process, alignment film 58 is applied onto the ITO, which is metal oxide. Since alignment film 58 has a good affinity for the ITO 56, the application process is easy. Moreover, the adhesiveness to the substrate and the organic insulating film is improved by providing the ITO 56. In this way, it is possible to prevent moisture intrusion from outside.

The first substrate SUB1 is attached to the second substrate SUB2. In this case, as shown in FIG. 1A, sealing material 10 is provided in the first area ARE1 of the first substrate SUB1. In the manufacturing process, sealing material 10 is extruded in a circular pattern from a device for applying a sealing material. In this way, sealing material 10 is applied. A drop of sealing material 11 is put in the fifth area ARE5 of the first substrate SUB1, in other words, where the through portion HOL is to be formed. The dot drop position is preferably the central position of the fifth area ARE5. The amount of sealing material 11 at this time is appropriately set in consideration of the range of extension of the sealing material in the outer circumferential direction when the first substrate SUB1 and the second substrate SUB2 are pressed against each other. Thus, the sealing material does not excessively extend in the outer circumferential direction.

Figure 4:
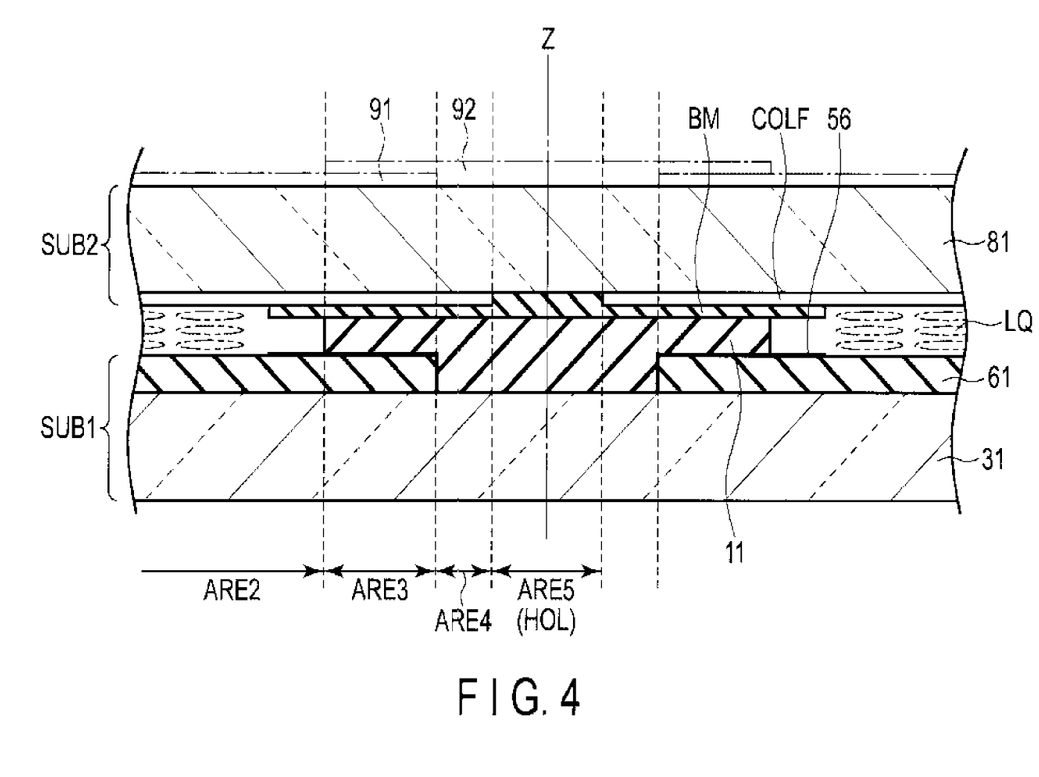
FIG. 4 is a schematic cross-sectional view when the first substrate SUB1 and a second substrate SUB2 are attached to each other in a process for manufacturing the display device according to the embodiment.

FIG. 4 schematically shows a cross-sectional surface when the first substrate SUB1 and the second substrate SUB2 are attached to each other in the manufacturing process. FIG. 4 shows glass plate 31 and the planarization film 61 on the first substrate SUB1 side. FIG. 4 shows a glass plate 81, the color filter layer COLF and the layer of a light-shielding film BM on the second substrate SUB2 side. In the figure, the light-shielding film BM is provided on the liquid crystal layer LQ side, and the color filter layer COLF is provided on the glass plate 81 side. However, their positions may be replaced with each other. As seen in plan view, the light-shielding film BM extends at least in the third area ARE3, the fourth area ARE4 and the fifth area ARE5. In the figure, the outer circumferential portion of the light-shielding film BM further extends in a part of the second area ARE2. However, this extended portion may be removed.

The light-shielding film BM is formed in the fifth area ARE5 (where the through portion HOL based on a z-axis is to be formed) and the vicinity of the fifth area ARE5. After the display device is manufactured, the light-shielding film BM is allowed to effectively block light leaking out from the vicinity of the through portion HOL to the second substrate SUB2 side. If the light-shielding film BM is not provided, unnecessary light reflected on the first substrate SUB1 side may leak out from the vicinity of the through portion HOL. In a planar view, the end portion of the light-shielding film BM may be provided in the same position as the end portion of the first substrate SUB1, or may be provided on the inner side in comparison with the position of the end portion of the first substrate SUB1.

A drop of sealing material 11 is put in the fifth area ARE5. This dot sealing material 11 is extended by pressing the second substrate SUB2 against the first substrate SUB1. In this way, sealing material 11 shown in FIG. 4 is formed. Sealing material 11 is cured by ultraviolet rays, etc. The space between the first substrate SUB1 and the second substrate SUB2 is filled with sealing material 11 in the third area ARE3, the fourth area ARE4 and the fifth area ARE5.

In FIG. 4, a polarizer 91 and an accessory plate 92 are shown by dashed lines since they are attached after the formation of the through portion HOL as described later. For the same reason, the polarizer 91 and the accessory plate 92 are shown by dashed lines in FIG. 5 and FIG. 7 explained later.

In the completed device, the polarizer 91 is attached to the external surface of glass plate 81 of the second substrate SUB2 (in other words, a side opposite to the liquid crystal layer). Moreover, the accessory plate 92 is attached to the upper surface the polarizer 91.

Around the fifth area ARE5, the inner circumferential edge of the accessory plate 92 is closer to the fifth area ARE5 (through portion HOL) than the inner circumferential edge of the polarizer 91. In the completed display device, the liquid crystal layer LQ is provided between the second substrate SUB2 and the first substrate SUB1. The polarizer 91 is provided on a side of the second substrate SUB2 so as to be opposite to the liquid crystal layer LQ. The accessory plate 92 is provided on the upper surface of the polarizer 91.

The radius of the inner circumferential edge of the polarizer 91 is set so as to be greater than that of the through portion HOL to prevent degradation of the polarizer 91 when the through portion HOL is formed. However, the radius of the inner circumferential edge of the accessory plate 92 is set so as to be less than that of the inner circumferential edge of the polarizer 91 such that the inner circumferential edge of the accessory plate 92 is closer to the through portion HOL than the inner circumferential edge of the polarizer 91.

This structure prevents the exposure of the light-shielding film BM on the inner circumferential side to outside, using the accessory plate 92. When the light-shielding film BM is provided on the inner side in comparison with the polarizer 91, the light-shielding film BM may be exposed to outside through the polarizer 91. However, the exposure of the light-shielding film BM to outside is prevented by the above structure. The accessory plate 92 covers and protects the end portion of the polarizer 91. At the same time, the accessory plate 92 prevents the exposure of the through portion HOL to outside. The accessory plate 92 may be used to secure the position of an insertion member which passes through the through portion HOL, such as a pin. The accessory plate 92 may be formed of a resin material or a metal material.

After the composition in the above manner, an opening process is applied to the fifth area ARE5 (a hole-making portion) by, for example, a laser, to form the through portion HOL based on the z-axis as the central axis. At this time, the intermediate composite component of the first substrate SUB1 and the second substrate SUB2 is filled with sealing material 11 in and around the fifth area ARE5. Thus, the strength of the intermediate composite component is enhanced. As a result, a hole-making process can be applied without twisting the intermediate composite component. In this way, the hole-making process can be safely carried out. In addition, the accuracy of the position or shape of the through portion HOL can be high. The through portion HOL is formed from the state where the fifth area ARE5 is filled with the sealing material as described above. Therefore, when the through portion HOL which penetrates the first substrate SUB1, sealing material 11 and the second substrate SUB2 is formed, the inner surface of the through portion HOL is continuous in the axial direction of the through portion on the same plane. Thus, the inner surface is continuous without asperities.

Figure 5:
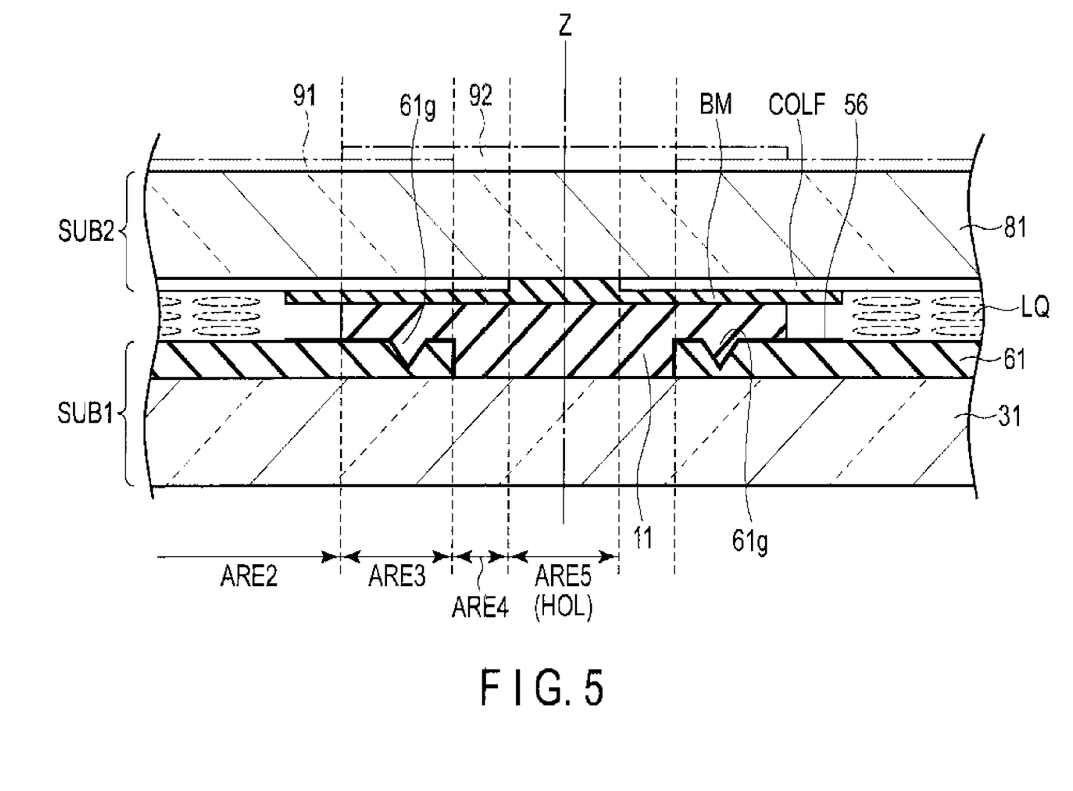
FIG. 5 is a schematic cross-sectional view when a first substrate SUB1 and a second substrate SUB2 are attached to each other in a process for manufacturing a display device according to another embodiment.

FIG. 5 shows another embodiment. The embodiment of FIG. 5 is different from that of FIG. 4 in respect that a ring-shaped groove (which may be referred to as a slit pattern) 61*g* is formed on the upper surface of a planarization film 61 in a third area ARE3. The other structures are the same as those of the embodiment of FIG. 4, detailed description thereof being omitted.

The cross-sectional surface of the groove 61*g* is V-shaped. However, the cross-sectional surface of the groove 61*g* may be rectangular or U-shaped, and is not limited to a particular shape. When a sealing material 11 is excessively applied, the groove 61*g* functions as a buffer or stopper which absorbs the redundant sealing material 11. In the manufacturing process, an appropriate amount of sealing material 11 is preferably applied in drops to the central position of a fifth area ARE5 (on a z-axis). However, the amount or position of the application is not always accurate because of various conditions such as the temperature and the viscosity of the sealing material. When a first substrate SUB1 and a second substrate SUB2 are attached to each other with an excessive amount of sealing material 11, sealing material 11 may extend to the outer circumferential side beyond the third area ARE3 designed as the limit. To solve this problem, the present embodiment is designed such that the redundant sealing material 11 is absorbed by the groove 61*g*.

Figure 6:
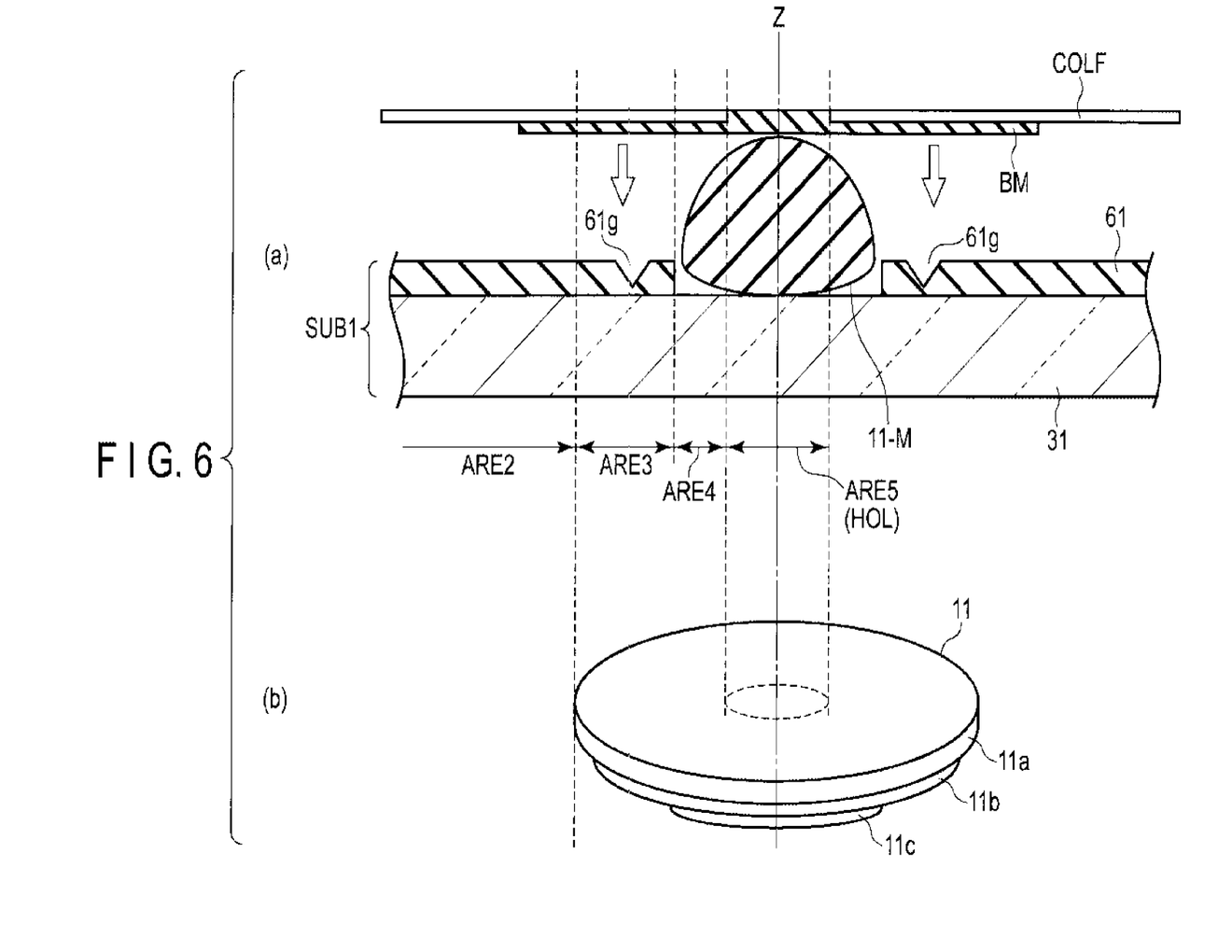
FIG. 6 is shown for explaining a state where a drop of a sealing material 11 is put and a state after sealing material 11 is pressed and shaped in the process for manufacturing the display device according to the embodiment of FIG. 5.

FIG. 6(*a*) shows a state 11-M where a drop of sealing material 11 is put in the fifth area ARE5 and is not pressed yet. FIG. 6(*b*) shows only sealing material 11 after sealing material 11 is pressed and shaped.

The shaped sealing material 11 integrally comprises an outer circumferential portion 11*a* located in the third area ARE3, an intrusion portion 11*b* located in the groove 61*g*, and a central portion 11*c* located in a fourth area ARE4 and the fifth area ARE5 where the planarization film 61 is not present. Because of this structure, when a drop of sealing material 11 is put in the fifth area ARE5, it is possible to relax the allowable range of the accuracy of the amount of sealing material 11, the application position, the environmental temperature and the viscosity of the sealing material. Thus, the manufacturing process can be simplified.

Figure 7:
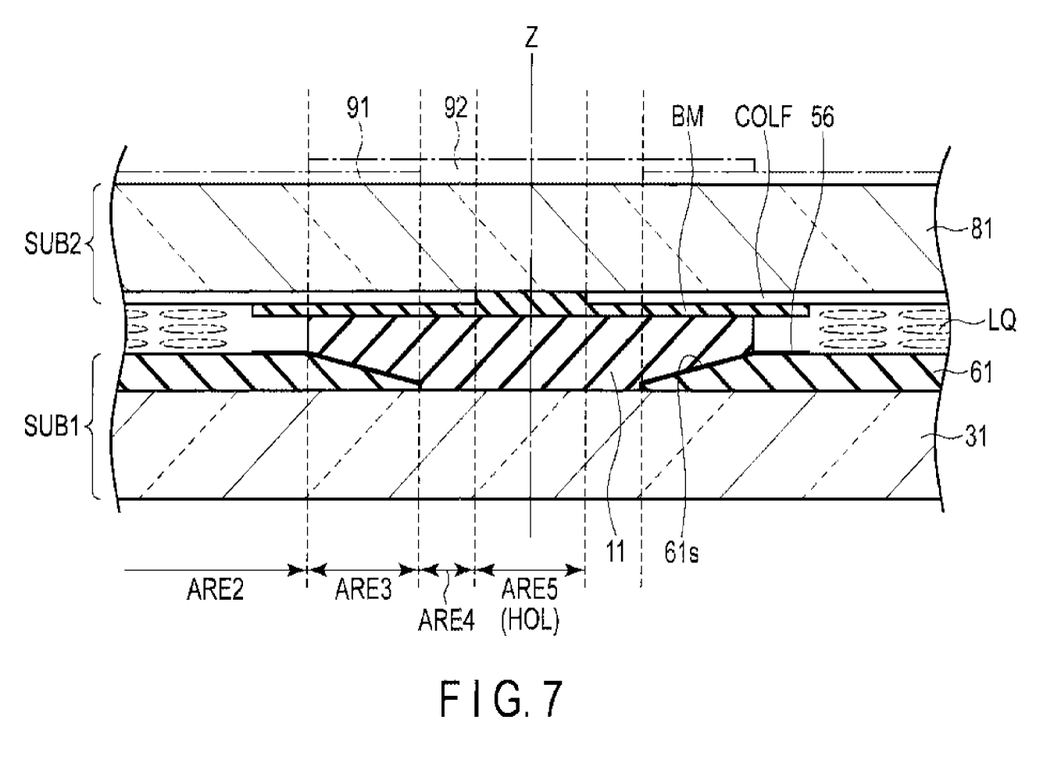
FIG. 7 is a schematic cross-sectional view when a first substrate SUB1 and a second substrate SUB2 are attached to each other in a process for manufacturing a display device according to yet another embodiment.

FIG. 7 shows yet another embodiment. The embodiment of FIG. 7 is different from that of FIG. 4 in respect that the thickness of a planarization film 61 is gradually reduced toward the innermost circumference in a third area ARE3. Thus, the planarization film 61 located in the third area ARE3 comprises an inclined surface 61-S. The other structures are the same as those of the embodiment of FIG. 4, detailed description thereof being omitted.

In this structure, the inclined surface 61-S is formed in the planarization film 61 around a fourth area ARE4. Thus, even when the amount of a sealing material 11 is excessive, sealing material 11 has difficulty in going beyond the third area ARE3. Furthermore, the strength is enhanced since sealing material 11 is thick. This embodiment is effective when the applied dot sealing material 11-M is off the central position of a fifth area ARE5 in the manufacturing process. Specifically, when the substrates are attached to each other, and the sealing material is pressed, the inclined surface 61-S of the planarization film 61 functions to transfer the sealing material from an excessive portion to a less portion. As a result, the sealing material can be extended equally based on the central position.

Figure 8A:
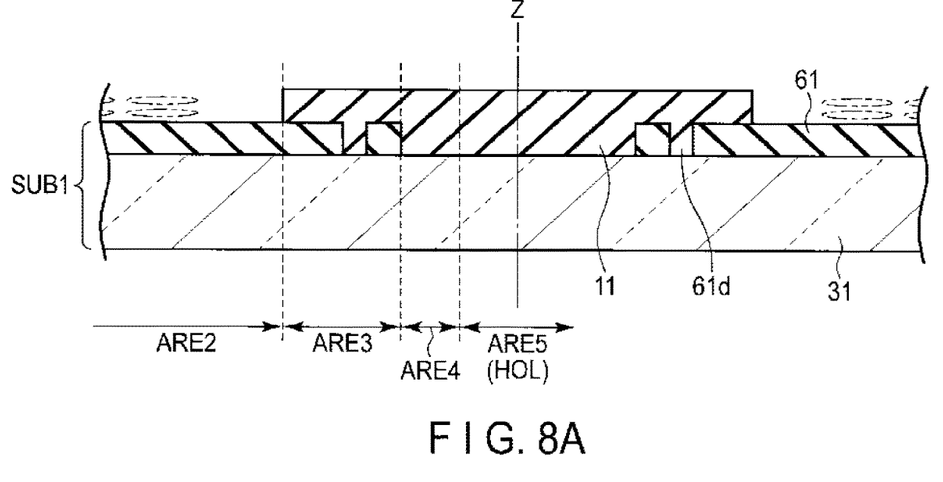
FIG. 8A schematically shows a part of a cross-sectional surface when a first substrate SUB1 and a second substrate SUB2 are attached to each other in a process for manufacturing a display device according to yet another embodiment.
Figure 8B:
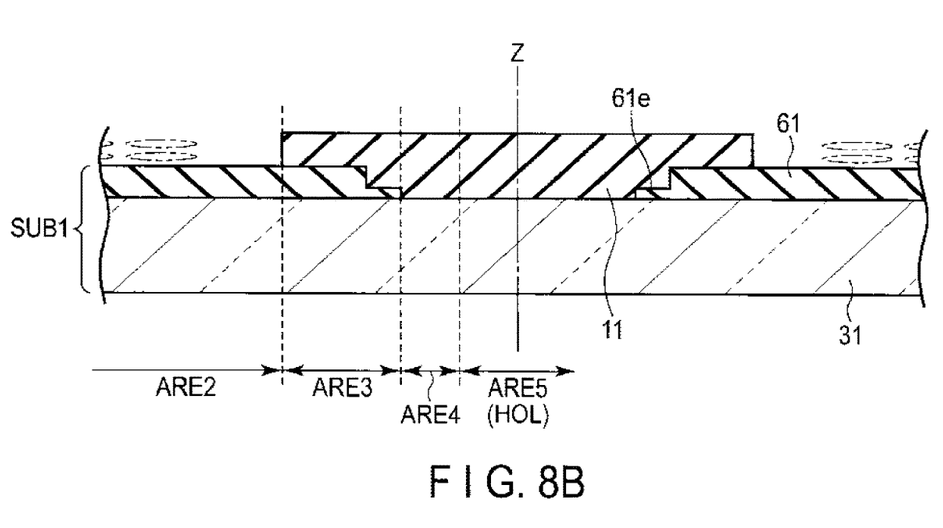
FIG. 8B schematically shows a part of a cross-sectional surface when a first substrate SUB1 and a second substrate SUB2 are attached to each other in a process for manufacturing a display device according to yet another embodiment.
Figure 8C:
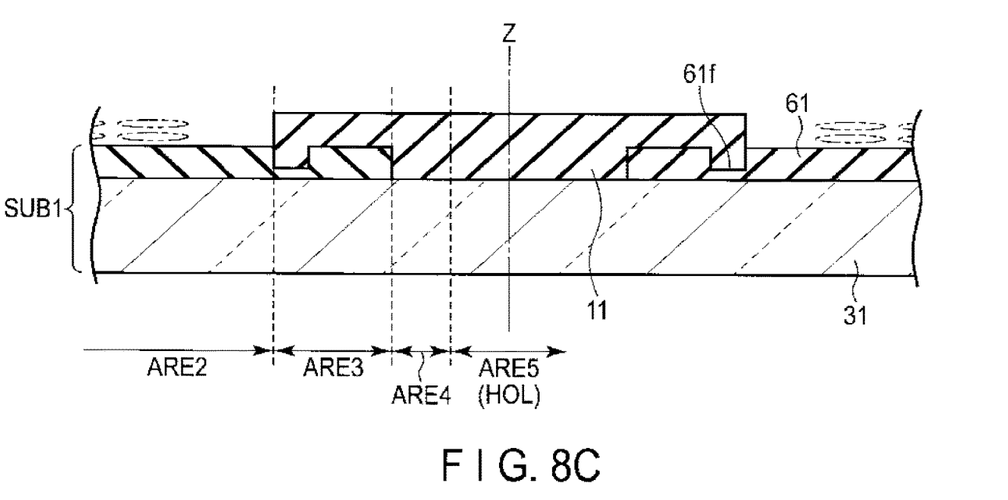
FIG. 8C schematically shows a part of a cross-sectional surface when a first substrate SUB1 and a second substrate SUB2 are attached to each other in a process for manufacturing a display device according to yet another embodiment.

FIG. 8A, FIG. 8B and FIG. 8C show other modification examples of a buffer or stopper formed in a planarization film 61. In the example of FIG. 8A, a ring-shaped groove 61*d* is formed away from the central circumferential edge of the planarization film 61. In the example of FIG. 8B, a step 61*e* is formed in the central circumferential edge of the planarization film 61 (in other words, the edge around a fourth area ERA4). The height (thickness) of the step 61*e* is preferably, for example, thirty to eighty percent of that of the highest portion of the planarization film 61. In the example of FIG. 8C, a depression 61f is formed where the planarization film 61 enters a third area ARE3. The other structures are the same as those of the above embodiments, detailed description thereof being omitted. In the embodiment of FIG. 8C, the depression 61f can prevent a sealing material 11 from expanding to a second area ARE2.

In a manner similar to that of FIG. 3, the planarization film 61 of FIG. 4 to FIG. 8A, FIG. 8B and FIG. 8C may be covered by a conductive film (ITO). An alignment film may be formed on the conductive film.

Figure 9:
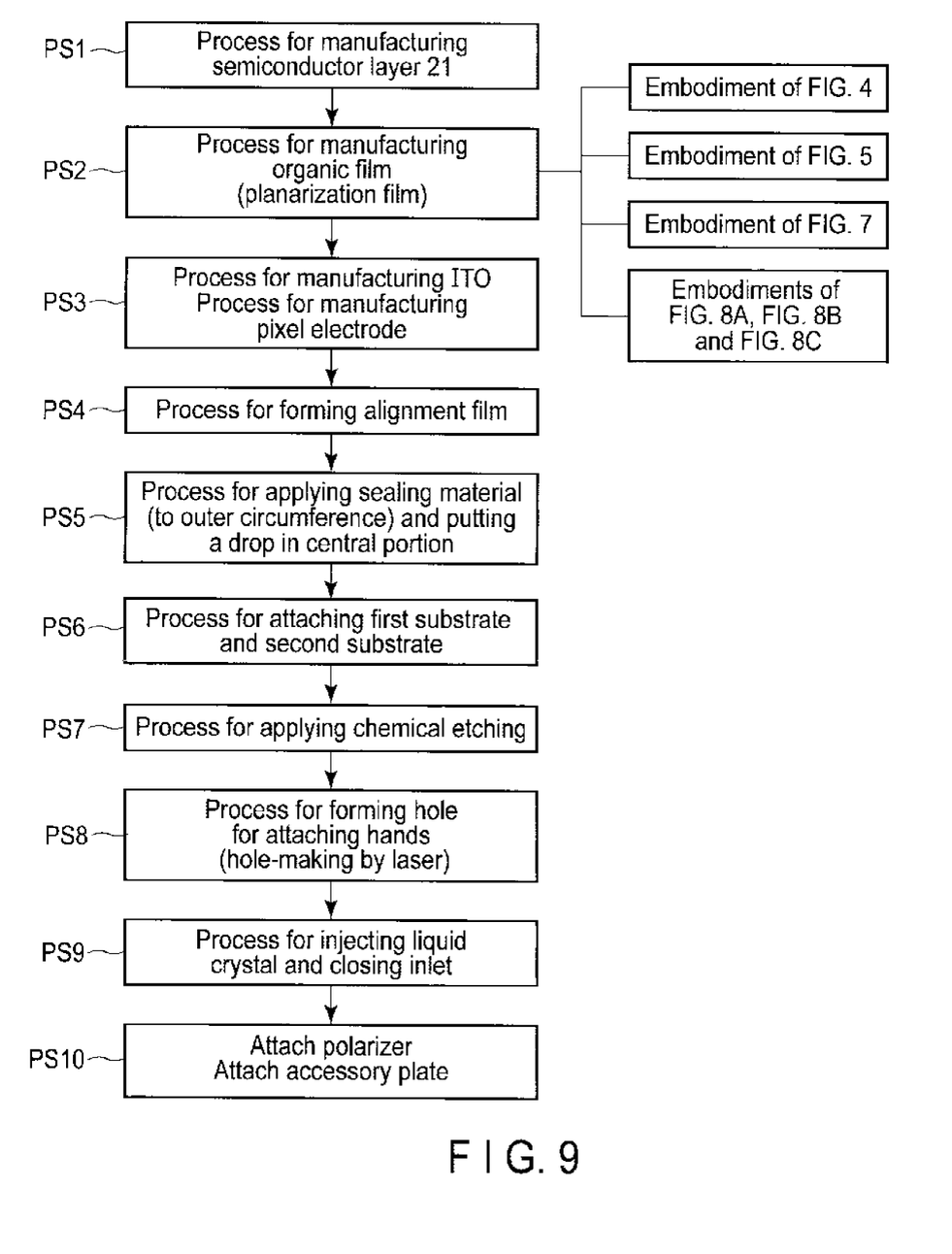
FIG. 9 is a process explanatory diagram shown for schematically explaining a process for manufacturing a display device according to one embodiment.

FIG. 9 is a process explanatory diagram schematically showing a process for manufacturing the display device of each of the above embodiments. The semiconductor layer 21 is formed on the first substrate SUB1 (process PS1). The process so far may be called the preparation process of the first substrate SUB1. Subsequently, an organic film (planarization film) is formed (process PS2). To form the planarization film, the process explained in FIG. 4, FIG. 5, FIG. 7 or FIG. 8A to FIG. 8C is selected.

After the planarization film is formed, ITO and a pixel electrode are formed (process PS3). Subsequently, an alignment film is formed (process PS4). After the alignment film is formed, a sealing material is applied. On the outer circumferential side of the substrate, the sealing material is applied in a circular pattern. In the fifth area ARE5, a drop of sealing material is put. Subsequently, the first substrate is attached to the second substrate (processes PS5 and PS6). When the base plates of the first and second substrates are glass plates, chemical etching is applied with hydrofluoric acid to the glass plates such that the glass plates are thin (process PS7). Subsequently, a through portion HOL for attaching hands is formed using a laser (process PS8). As the laser, for example, a pulsed carbon dioxide laser is used. However, the laser is not limited to this example.

A liquid crystal is injected through an inlet provided in a part of the sealing material. After the injection, the inlet is closed (process PS9). A polarizer is attached to the external side of the second substrate SUB2. Subsequently, an accessory plate is attached to the upper surface of the polarizer (process SP10). By the above procedure, the trace of the inlet remains in the display device after the liquid crystal is encapsulated. For example, a sealant remains after the inlet is closed.

In the process for manufacturing the second substrate SUB2, the polarizer 91 is provided on a side of the second substrate SUB2 so as to be opposite to the first substrate SUB1. Further, the accessory plate 92 is provided on the upper surface of the polarizer 91. Around the fifth area ARE5, in other words, around the through portion HOL of the completed device, the radius of the inner circumferential edge of the polarizer 91 is greater than that of the inner circumferential edge of the accessory plate 92.

Figure 10:
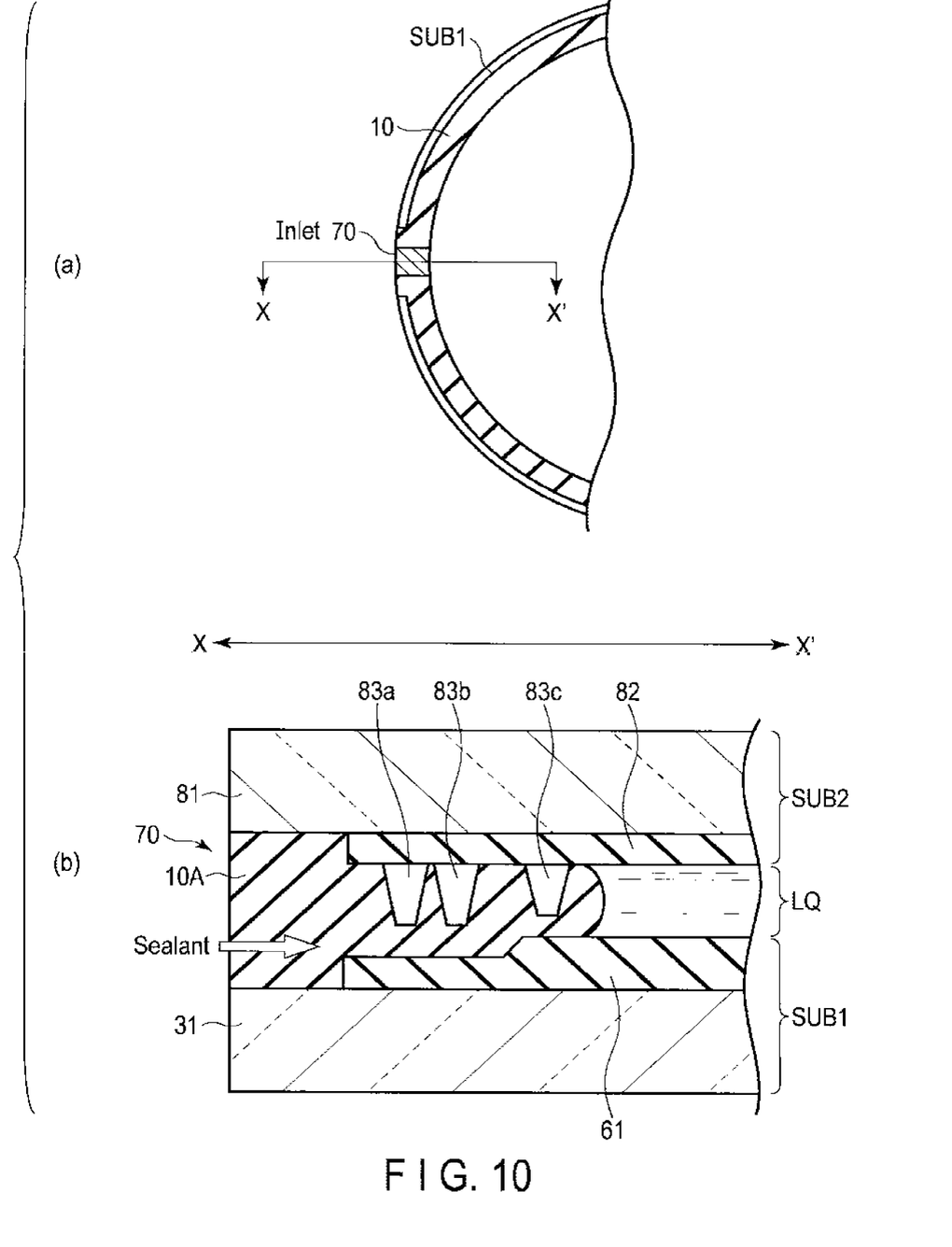
FIG. 10 includes a planar view and a cross-sectional view showing the vicinity of an inlet for a liquid crystal.

FIG. 10(a) is a planar view showing an inlet 70 formed to inject a liquid crystal. FIG. 10(b) is a cross-sectional view taken along line X-X' after the inlet 70 is sealed by sealant 10A. When the first substrate SUB1 is attached to the second substrate SUB2, the inlet 70 is formed in a part of sealing material 10. In the inlet 70, a planarization film 82 formed on glass plate 81 of the second substrate SUB2 faces the planarization film 61 formed on glass plate 31 of the first substrate SUB1. Spacers 83a, 83b and 83c are provided on the planarization film 82 of the second substrate SUB2 to maintain the strength. The inlet 70 is sealed by the sealant 10A after the liquid crystal is injected.

Figure 11A:
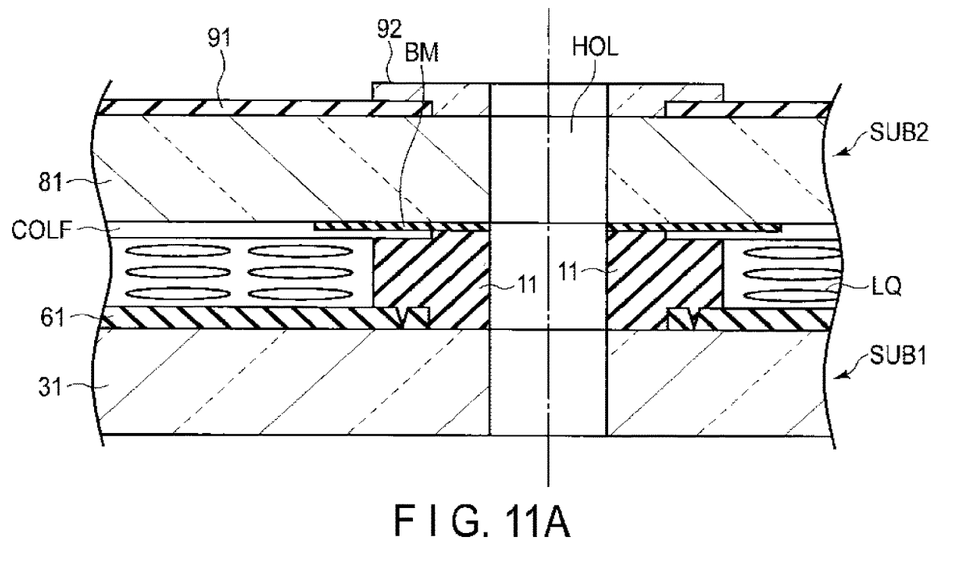
FIG. 11A shows the relationship between a polarizer and an accessory plate around a through portion in a display device according to one embodiment.

FIG. 11A shows the positional relationships between the members formed on glass plate 81 of the second substrate SUB2 and the members formed on the first substrate SUB1 around the through portion HOL. The light-shielding film BM is formed on the liquid crystal layer LQ side of glass plate 81. The polarizer 91 is attached to the external side of glass plate 81 (in other words, to the side opposite to the liquid crystal layer). Moreover, the accessory plate 92 is attached to the upper surface of the polarizer 91.

As seen in plan view, the light-shielding film BM near the through portion HOL overlaps at least the second area and the third area. The light-shielding film BM may be provided in a part of the first area, the second area, the third area and a part of the fourth area. Near the through portion HOL, the inner circumferential edge of the accessory plate 92 is closer to the through portion HOL than the inner circumferential edge of the polarizer 91. The liquid crystal layer LQ is located between the first substrate SUB1 and the second substrate SUB2. The polarizer 91 is provided on a side of the second substrate SUB2 so as to be opposite to the liquid crystal layer LQ. Moreover, the accessory plate 92 is provided on the upper surface of the polarizer 91. Around the through portion HOL, the radius of the inner circumferential edge of the polarizer 91 is greater than that of the inner circumferential edge of the accessory plate 92. This structure prevents the exposure of the light-shielding film BM on the inner circumferential side to outside, using the accessory plate 92. When the polarizer 91 extends to the inner circumferential side, the light-shielding film BM is exposed to outside through the polarizer 91. However, the exposure of the light-shielding film BM to outside is prevented by the above structure.

Figure 11B:
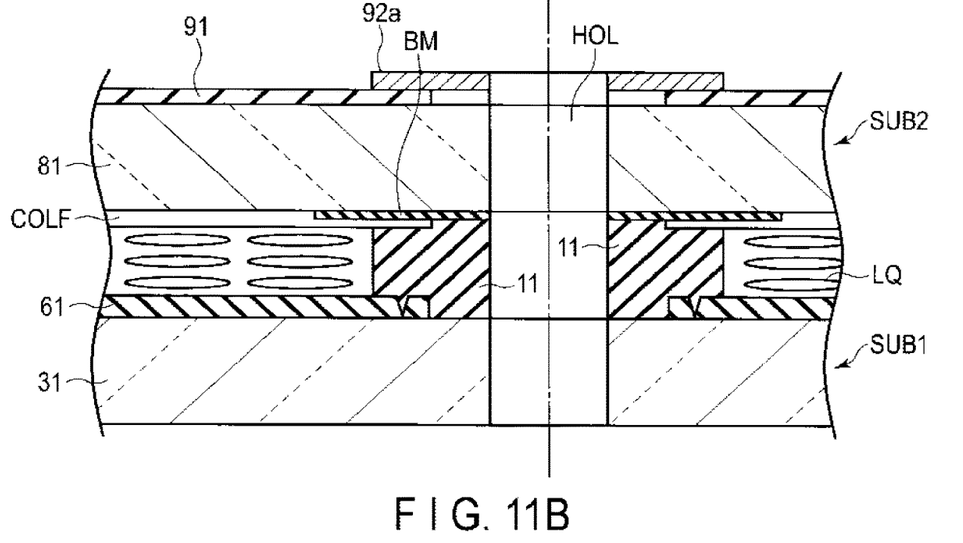
FIG. 11B shows a modification example of the embodiment of FIG. 11A.

FIG. 11B is a modification example of the structure shown in FIG. 11A. In the embodiment shown in FIG. 11A, the accessory plate 92 is attached to the upper surface of the polarizer 91. Apart from this example, a washer type accessory plate 92a may be attached. This type of accessory plate 92a can also exhibit a function for retaining the position of the axis of the through portion HOL and an aesthetic appearance designing function which prevents the exposure of the light-shielding film BM to outside.

Figure 12:
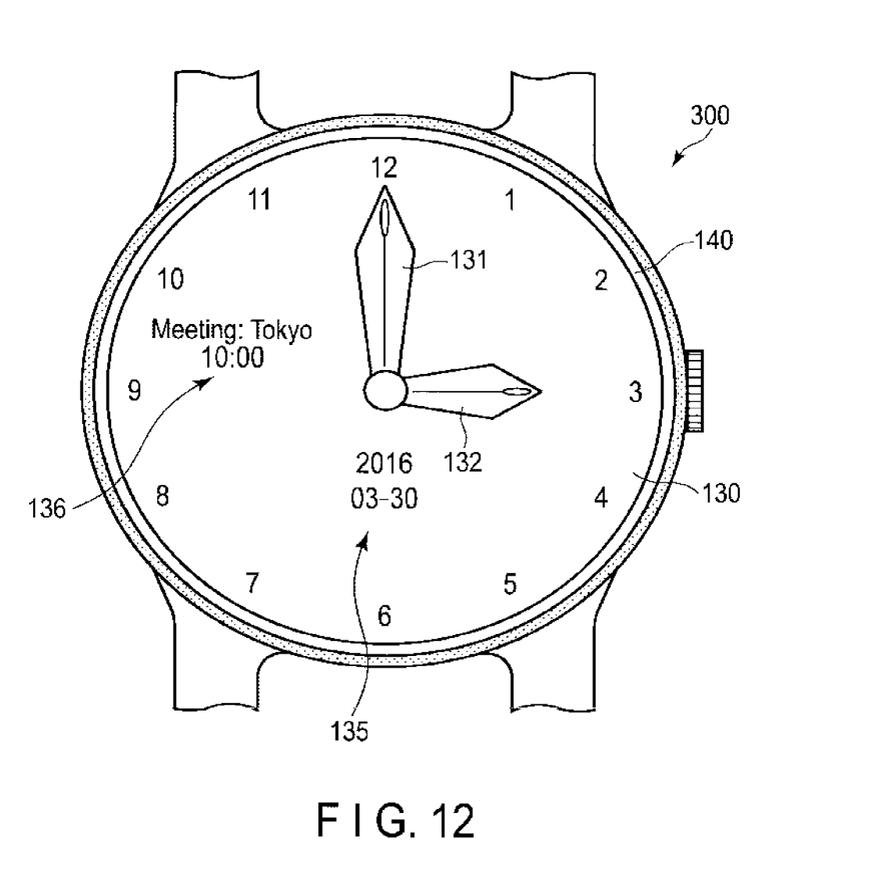
FIG. 12 shows the external appearance of a watch device to which one embodiment of the present invention is applied.

FIG. 12 shows an example of the external appearance of a watch device (wearable device) 300 to which the present invention is applied. A circular dial 130 is retained by a ring-shaped outer casing 140. As explained in the above embodiments, the dial 130 comprises the first substrate SUB1, the second substrate SUB2, the liquid crystal layer LQ, etc., and is capable of functioning as a display device. The shaft of a long hand 131 and the shaft of a short hand 132 pass through the through portion HOL. The long hand 131 and the short hand 132 rotating based on the axes along the upper surface of the dial are attached to the shaft of the long hand and the shaft of the short hand, respectively. The shaft of the long hand and the shaft of the short hand are rotated by a clock motor provided inside the watch device 300.

In the display device, its display function is effectively used. For example, the display device is capable of displaying the current date 135 and the plans for the date 136. For example, a memory chip is mounted to display a schedule, a date and a message. Data is input to the memory chip from, for example, a personal computer. The watch device 300 may have a wireless communication function, receive a specific radio wave from outside and load the data of the schedule for meetings into the memory chip.

While certain preferred embodiments have been described, these embodiments have been presented by way of example only, and are not intended to limit the scope of the invention. Various changes may be made without departing from the spirit of the invention. Each embodiment may be applied to a display device for a vehicle speed meter in which a through portion such as a circular hole is provided in a display area, as well as a display device for a watch. Furthermore, each embodiment may be applied to a smart phone having a display area which is formed through portion to avoid a position corresponding to a camera. Moreover, each embodiment may be applied to a display device for a gauge or meter for various vehicles such as an airplane, a boat, a ship and a railway vehicle. Proper changes in keeping with the spirit of the invention come within the technical scope of the invention as a matter of course.

What is claimed is:

1. A display device comprising:
    a first substrate comprising an area displaying an image;
    an organic insulating film provided on the first substrate;
    a second substrate facing the first substrate;
    a light-shielding film provided on the second substrate;
    a polarizer provided on a surface opposite to a surface of the second substrate provided with the light-shielding film; and
    a sealing material attaching the first substrate and the second substrate, wherein
    the first substrate and the second substrate have a through portion through the first substrate and the second substrate,
    the sealing material includes a first sealing material in the area and a second sealing material surrounding the area,
    the first sealing material is between the through portion and the area, and overlaps with the organic insulating film and the light-shielding film in a plan view,
    an end of the polarizer overlaps with the first sealing material and the organic insulating film in the plan view, and
    the end of the polarizer is closer to the area than an end of the second substrate on the through portion side.

2. The display device according to claim 1, wherein the first sealing material contacts to the first substrate in the second portion.

3. The display device according to claim 1, further comprising:
    a color filter layer provided on the second substrate, wherein
    the first sealing material overlaps with the color filter layer, in a plan view.

4. The display device according to claim 1, further comprising:
    a color filter layer provided on the second substrate, wherein
    the first sealing material overlaps with the color filter layer, in a plan view.

5. A display device comprising:
    a first substrate comprising an area displaying an image;
    a first organic film provided on the first substrate;
    a second substrate facing the first substrate;
    a polarizer provided on a surface opposite to a surface of the second substrate facing the first substrate; and
    a sealing material attaching the first substrate and the second substrate, wherein
    the first substrate and the second substrate have a through portion through the first substrate and the second substrate,
    the sealing material includes a first sealing material in the area and a second sealing material surrounding the area,
    the through portion through the first substrate, the second substrate, and the first sealing material,
    an end of the polarizer overlaps with the first sealing material and the first organic film, and
    the end of the polarizer is closer to the area than an end of the second substrate on the through portion side.

6. The display device according to claim 5, wherein the first sealing material is between the through portion and the area, and overlaps with the first organic film, in a plan view.

7. The display device according to claim 1, wherein
    the second substrate includes a first end on the through portion side and a second end opposite to the first end,
    the first substrate includes a third end on the through portion side and a fourth end opposite to the third end, and
    in a sectional view, the second end and the fourth end are aligned.

8. The display device according to claim 7, wherein in a sectional view, the first end and the third end are aligned.

9. The display device according to claim 5, wherein
    the second substrate includes a first end on the through portion side and a second end opposite to the first end,
    the first substrate includes a third end on the through portion side and a fourth end opposite to the third end, and
    in a sectional view, the second end and the fourth end are aligned.

10. The display device according to claim 9, wherein in a sectional view, the first end and the third end are aligned.

* * * * *